US012676313B2

(12) United States Patent
IIzumi et al.

(10) Patent No.: US 12,676,313 B2
(45) Date of Patent: Jul. 7, 2026

(54) ELECTRODE FOR ALL-SOLID-STATE SECONDARY BATTERIES, ALL-SOLID-STATE SECONDARY BATTERY AND METHOD FOR PRODUCING ALL-SOLID-STATE SECONDARY BATTERY

(71) Applicant: UBE CORPORATION, Ube (JP)

(72) Inventors: Nobu IIzumi, Ube (JP); Takeshige Nakayama, Ube (JP); Masanori Morishita, Yonezawa (JP); Tetsuo Sakai, Ikeda (JP)

(73) Assignee: UBE CORPORATION, Ube (JP)

( * ) Notice: Subject to any disclaimer, the term of this patent is extended or adjusted under 35 U.S.C. 154(b) by 629 days.

(21) Appl. No.: 18/001,151

(22) PCT Filed: Jun. 24, 2021

(86) PCT No.: PCT/JP2021/023977
§ 371 (c)(1),
(2) Date: Dec. 8, 2022

(87) PCT Pub. No.: WO2021/261561
PCT Pub. Date: Dec. 30, 2021

(65) Prior Publication Data
US 2023/0238532 A1 Jul. 27, 2023

(30) Foreign Application Priority Data

Jun. 25, 2020 (JP) ................................. 2020-110037

(51) Int. Cl.
| | |
|---|---|
| H01M 4/62 | (2006.01) |
| H01M 4/04 | (2006.01) |
| H01M 4/139 | (2010.01) |
| H01M 10/0562 | (2010.01) |
| H01M 10/0565 | (2010.01) |

(52) U.S. Cl.
CPC ......... H01M 4/622 (2013.01); H01M 4/0404 (2013.01); H01M 4/0471 (2013.01); H01M 4/139 (2013.01); H01M 4/62 (2013.01); H01M 4/624 (2013.01); H01M 10/0562 (2013.01); H01M 10/0565 (2013.01)

(58) Field of Classification Search
None
See application file for complete search history.

(56) References Cited

U.S. PATENT DOCUMENTS

| | | | | |
|---|---|---|---|---|
| 5,888,672 A | * | 3/1999 | Gustafson | ......... H01M 10/0525 29/623.5 |
| 2005/0250015 A1 | | 11/2005 | Wensley et al. | |
| 2007/0269718 A1 | | 11/2007 | Krause et al. | |
| 2012/0214064 A1 | | 8/2012 | Sabi | |
| 2013/0212879 A1 | | 8/2013 | Ogino | |
| 2013/0260020 A1 | | 10/2013 | Tomikawa et al. | |

| | | | |
|---|---|---|---|
| 2014/0162139 A1 | | 6/2014 | Hoshiba et al. |
| 2015/0086874 A1 | | 3/2015 | Kondo et al. |
| 2017/0194645 A1 | | 7/2017 | Nakayama et al. |
| 2017/0288144 A1 | | 10/2017 | Makino et al. |
| 2018/0114975 A1 | | 4/2018 | Yanagida et al. |
| 2018/0277891 A1 | | 9/2018 | Mimura et al. |
| 2018/0351176 A1 | | 12/2018 | Miki |
| 2019/0148719 A1 | | 5/2019 | Kouzaki et al. |
| 2021/0320331 A1 | | 10/2021 | Anani |
| 2022/0085374 A1 | | 3/2022 | Nakayama et al. |

FOREIGN PATENT DOCUMENTS

| | | | |
|---|---|---|---|
| CN | 101454927 A | | 6/2009 |
| CN | 102668190 A | | 9/2012 |
| JP | 2003-92138 A | | 3/2003 |
| JP | 2003-173769 A | | 6/2003 |
| JP | 2013-45683 A | | 3/2013 |
| JP | 2014-116154 A | | 6/2014 |
| JP | 2016-012561 A | | 1/2016 |
| JP | 2016-212990 A | | 12/2016 |
| JP | 2018-152253 A | | 9/2018 |
| JP | 2018-181750 A | | 11/2018 |
| JP | 2018-206755 A | | 12/2018 |
| WO | WO 2016/125716 A1 | | 8/2016 |
| WO | WO 2017/099248 A1 | | 6/2017 |
| WO | WO 2020/033538 A1 | | 2/2020 |
| WO | WO 2020/138187 A1 | | 7/2020 |

OTHER PUBLICATIONS

Machine translation of JP 2016212990, Dec. 2016.*
Machine translation of JP 2018152253, Sep. 2018.*
Supplementary European Search Report in European Patent Application No. 19905985.8 issued on Aug. 24, 2022 in 8 pages.
Sakuda Atsushi et al., All-Solid-State Battery Electrode Sheets Prepared by a Slurry Coating Process, Journal of the Electrochemical Society, vol. 164, No. 12, Aug. 19, 2017, pp. A2474-A2478.
Office Action in Chinese Patent Application No. 201980084975.8 issued on Dec. 15, 2023 & English translation in 13 pages.
Restriction Requirement in U.S. Appl. No. 17/309,846 mailed on Dec. 26, 2023 in 10 pages.

(Continued)

*Primary Examiner* — Jonathan Crepeau
(74) *Attorney, Agent, or Firm* — Knobbe Martens Olson & Bear LLP

(57) ABSTRACT

An electrode for all-solid-state secondary batteries which enables the achievement of a practicable all-solid-state secondary battery even if an electrode active material layer does not contain a solid electrolyte which has been an essential ingredient for conventional electrodes for all-solid-state secondary batteries; and a practicable all-solid-state secondary battery which uses an electrode in which an electrode active material layer does not contain a solid electrolyte. The all-solid-state secondary battery includes a positive electrode, a solid electrolyte layer and a negative electrode, the positive electrode and/or the negative electrode has an electrode active material layer on a collector, the electrode active material layer contains an electrode active material and a binder resin; the binder resin contains a polyimide resin; and the electrode active material layer does not contain a solid electrolyte, while containing a lithium salt that has a solubility of 0.1 g or more per 100 g of a solvent at 25° C. with respect to water or at least one organic solvent.

9 Claims, No Drawings

(56) References Cited

OTHER PUBLICATIONS

Office Action of U.S. Appl. No. 17/309,846 mailed on Mar. 4, 2024 in 13 pages.

International Search Report in Application PCT/JP2021/023977, mailed Sep. 7, 2021 in 3 pages.

International Preliminary Report on Patentability and PCT Written Opinion in Application No. PCT/JP2021/023977, issued Dec. 13, 2022 and Sep. 7, 2021, respectively, in 5 pages.

Litao Yan et al., "Electrodes with High Conductivities for High Performance Lithium/Sodium Ion Batteries", Engineered Science, Jan. 1, 2018, pp. 4-20, XP093150816.

Fuminori Mizuno et al., "Effects of Conductive Additives in Composite Positive Electrodes on Charge-Discharge Behaviors of All-Slid-State Lithium Secondary Batteries", Journal of The Electrochemical Society, vol. 152, No. 8, Jan. 1, 2005, pp. A1499-A1503, XP055280962.

Communication Pursuant to Article 94(3) EPC in corresponding European Patent Application No. 19905985.8 dated Jun. 25, 2024 in 8 pages.

Final Office Action of U.S. Appl. No. 17/309,846 mailed on Jun. 21, 2024 in 10 pages.

Markowitz et al., "Lithium Salts as Solutes in Nonaqueous Media", *Journal of Chemical and Engineering Data*, vol. 6, No. 3, pp. 325-327, Jul. 1961.

Xi et al. "Polymer-based solid electrolytes: material selection, design, and application." *Advanced Functional Materials* 31.9 (2021): 2007598.

* cited by examiner

ELECTRODE FOR ALL-SOLID-STATE SECONDARY BATTERIES, ALL-SOLID-STATE SECONDARY BATTERY AND METHOD FOR PRODUCING ALL-SOLID-STATE SECONDARY BATTERY

This application is the U.S. National Phase under 35 U.S.C. § 371 of International Application PCT/JP2021/023977, filed Jun. 24, 2021, designating the U.S., and published in Japanese as WO 2021/261561 on Dec. 30, 2021, which claims priority to Japanese Patent Application No. 2020-110037, filed Jun. 25, 2020, the entire content of which is incorporated herein by reference.

TECHNICAL FIELD

The present disclosure relates to an electrode for an all-solid-state secondary battery, an all-solid-state secondary battery, and a method for producing an all-solid-state secondary battery.

BACKGROUND ART

Lithium-ion secondary batteries have been widely used as a drive power source for mobile data terminals, etc. since they have high energy density and high capacity. In recent years, the use of lithium-ion secondary batteries is also spreading in industrial applications such as installation in electric and hybrid vehicles, which require large capacity. Studies are being made for higher capacity and higher performance of lithium-ion secondary batteries.

While there is a demand for high energy density of lithium-ion secondary batteries, assurance and improvement of safety of the batteries are also desired. Studies are also being made for all-solid-state secondary batteries that employ a non-flammable inorganic solid electrolyte in place of a non-aqueous electrolyte solution in which an electrolyte salt such as a lithium salt is dissolved in an organic solvent. All-solid-state secondary batteries include a positive electrode, a negative electrode, and a solid electrolyte layer disposed therebetween. Generally, the electrodes, specifically the positive electrode active material layer and the negative electrode active material layer, also contain a solid electrolyte in terms of performance.

For example, Patent Document 1 discloses an all-solid-state secondary battery that includes a positive electrode active material layer, an inorganic solid electrolyte layer, and a negative electrode active material layer in this order, wherein the positive electrode active material layer, the inorganic solid electrolyte layer, and the negative electrode active material layer contain a predetermined polymer and inorganic solid electrolyte. Patent Document 2 discloses: an electrode for a solid electrolyte battery, in which a mixture of a powdery active material, solid electrolyte and conductive auxiliary agent is bound by a predetermined binder to form a film of an active material layer on a current collector; and a solid electrolyte battery of which at least one of the positive electrode and the negative electrode is the electrode for a solid electrolyte battery. Patent Document 3 discloses an all-solid-state secondary battery that includes a positive electrode active material layer, a solid electrolyte layer, and a negative electrode active material layer in this order, wherein the positive electrode active material layer, the negative electrode active material layer, and the solid electrolyte layer contain: an inorganic solid electrolyte that conducts ions of metal elements belonging to Group 1 or 2 of the periodic table; and binder particles that include an ion conductive material, i.e. an inorganic solid electrolyte or a liquid electrolyte.

Patent Document 4 discloses a solid-state battery that includes a positive electrode, a negative electrode, and a solid electrolyte layer made of a solid electrolyte provided therebetween, wherein the negative electrode includes a negative electrode active material, a first binder that is bound to the solid electrolyte and is inert to the solid electrolyte, and a second binder having a better binding property to a negative electrode current collector than the first binder; and the second binder contains a highly elastic resin. Patent Document 4 discloses that the negative electrode thereof does not contain a solid electrolyte, but in the examples thereof, an electrolyte layer coating liquid is applied on a negative electrode structure and then dried to form an electrolyte layer on the negative electrode structure. In this method, the solid electrolyte swells (permeates) from the electrolyte layer into a negative electrode layer when the solid-state battery is produced, i.e., when the electrolyte layer coating liquid is applied on the negative electrode. Therefore, the resulting negative electrode layer will contain the solid electrolyte.

Patent Document 5 discloses an all-solid-state secondary battery that includes a positive electrode active material layer, a solid electrolyte layer, and a negative electrode active material layer in this order. In this all-solid-state secondary battery, the amount of an inorganic solid electrolyte contained in at least one of the positive electrode active material layer and the negative electrode active material layer is 0 to 10% by mass with respect to the total solid content of the layer. The solid electrolyte layer contains a sulfide-based solid electrolyte. At least one of the positive electrode active material layer and the negative electrode active material layer contains a binder, and the negative electrode active material layer contains a predetermined negative electrode active material. However, in the examples of Patent Document 5, a solid electrolyte composition is applied on a positive electrode active material layer of a positive electrode sheet for secondary batteries and heated to form a solid electrolyte layer. Then, a composition for a negative electrode of a secondary battery is applied on the dried solid electrolyte layer and heated to form a negative electrode active material layer. In this method, similarly to the method described in Patent Document 4, the solid electrolyte permeates into the positive electrode active material layer and the negative electrode active material layer, so that the resulting positive electrode active material layer and negative electrode active material layer will contain the solid electrolyte.

Further, studies are also being made for all-solid-state secondary batteries using an organic solid electrolyte, i.e., a polymer solid electrolyte instead of an inorganic solid electrolyte. Also in this case, the electrodes (specifically, the positive electrode active material layer and the negative electrode active material layer) generally contain a solid electrolyte in terms of performance. For example, Patent Document 6 discloses a polymer solid electrolyte lithium battery that includes a positive electrode using a compound mainly composed of a transition metal oxide as a positive electrode active material, a negative electrode using a lithium metal, a lithium alloy, or a substance capable of occluding and releasing lithium ions as a negative electrode active material, and an electrolyte, wherein the electrolyte is a predetermined polymer solid electrolyte. In one example of Patent Document 6, the formed positive electrode active material layer is impregnated with a precursor of the polymer solid electrolyte and cured by electron beam radiation to form a composite positive electrode containing an electrolyte.

CITATION LIST

Patent Literature

Patent Document 1: WO2016/125716
Patent Document 2: JP-A-2013-45683
Patent Document 3: WO2017/099248
Patent Document 4: JP-A-2014-116154
Patent Document 5: JP-A-2016-212990
Patent Document 6: JP-A-2003-92138

SUMMARY OF INVENTION

Technical Problem

The present disclosure is for providing an electrode for an all-solid-state secondary battery that realizes a practical all-solid-state secondary battery that can work without containing a solid electrolyte, which was an essential component for conventional electrodes for all-solid-state secondary batteries, contained in an electrode active material layer; a practical all-solid-state secondary battery that employs an electrode of which electrode active material layer does not contain a solid electrolyte; and a producing method of an all-solid-state secondary battery.

Solution to Problem

The present disclosure relates to the following items.

[1] An electrode for an all-solid-state secondary battery, including an electrode active material layer that includes: an electrode active material; and a binder resin, on a current collector. The binder resin contains a polyimide-based resin. The electrode active material layer contains a lithium salt having a solubility in water or at least one organic solvent at 25° C. of 0.1 g/100 g of solvent or more and does not contain a solid electrolyte.

[2] The electrode according to Item [1], in which the electrode active material layer further contains a conductive auxiliary agent.

[3] The electrode according to Item [1] or [2], in which the lithium salt has an ionic conductivity at 25° C. of $1 \times 10^{-4}$ S/cm or more.

[4] The electrode according to any one of Items [1] to [3], in which the lithium salt is $\mathrm{LiN(FSO_2)_2}$ or a perfluoroalkane sulfonylimide salt or both.

[5] The electrode according to any one of Items [1] to [4], in which the lithium salt is at least one selected from the group consisting of $\mathrm{LiN(FSO_2)_2}$, $\mathrm{LiN(CF_3SO_2)_2}$, LiN $\mathrm{(CF_3CF_2SO_2)_2}$, and $\mathrm{LiN(CF_3SO_2)(C_4F_9SO_2)}$.

[6] An all-solid-state secondary battery, including: a positive electrode; a solid electrolyte layer; and a negative electrode, in which the positive electrode and/or the negative electrode is the electrode according to any one of Items [1] to [5].

[7] A method for producing an electrode for an all-solid-state secondary battery, including: applying, on a current collector, an electrode mixture paste that contains an electrode active material, a polyimide-based resin or a precursor thereof as a binder resin, a lithium salt having a solubility in water or at least one organic solvent at 25° C. of 0.1 g/100 g of solvent or more, and a solvent and does not contain a solid electrolyte; and drying or heat-treating the electrode mixture paste to form an electrode active material layer.

[8] A method for producing an all-solid-state secondary battery, including: preparing an electrode sheet having, on a current collector, an electrode active material layer that contains an electrode active material, a polyimide-based resin as a binder resin, and a lithium salt having a solubility in water or at least one organic solvent at 25° C. of 0.1 g/100 g of solvent or more and does not contain a solid electrolyte; and laminating and integrating the electrode sheet, a solid electrolyte-containing sheet that contains a solid electrolyte, and a counter electrode sheet.

[9] The method for producing an all-solid-state secondary battery according to Item [8], in which preparing the electrode sheet includes: applying, on the current collector, an electrode mixture paste that includes the electrode active material, the polyimide-based resin or a precursor thereof as the binder resin, the lithium salt having the solubility in water or at least one organic solvent at 25° C. of 0.1 g/100 g of solvent or more, and a solvent and does not include a solid electrolyte; and drying or heat-treating the electrode mixture paste to form the electrode active material layer.

[10] The method for producing an all-solid-state secondary battery according to Item [8] or [9], in which the electrode sheet, the solid electrolyte-containing sheet, and the counter electrode sheet are laminated and integrated by dry process.

Advantageous Effects of Invention

The present disclosure can provide an electrode for an all-solid-state secondary battery that realizes a practical all-solid-state secondary battery that can work without containing a solid electrolyte, which was an essential component for conventional electrodes for all-solid-state secondary batteries, contained in an electrode active material layer; a practical all-solid-state secondary battery that employs an electrode of which electrode active material layer does not contain a solid electrolyte; and a producing method of an all-solid-state secondary battery.

DESCRIPTION OF EMBODIMENTS

Hereinafter, a mode for carrying out the present disclosure (hereinafter, simply referred to as "the present embodiment") will be described. The present embodiment below is an example for explaining the present disclosure, and it is not intended to limit the present disclosure to the following description. The present disclosure may be appropriately modified and implemented within the scope of the gist thereof.

An electrode for an all-solid-state secondary battery according to the present embodiment includes: an electrode active material; a polyimide-based resin as a binder resin; and a lithium salt having a solubility in water or at least one organic solvent at 25° C. of 0.1 g/100 g of solvent or more (preferably a lithium salt having a solubility in at least one organic solvent at 25° C. of 0.1 g/100 g of solvent or more and an ionic conductivity at 25° C. of $1 \times 10^{-4}$ S/cm or more), the electrode having an electrode active material layer that does not contain a solid electrolyte, on a current collector. The electrode active material layer of the electrode for an all-solid-state secondary battery of the present embodiment preferably does not contain an ionic liquid, either. Here, the ionic liquid refers to an electrolyte that is in a liquid state in an environment at one atmosphere pressure at 25° C.

An all-solid-state secondary battery according to the present embodiment includes: a positive electrode; a solid electrolyte layer; and a negative electrode, and the positive electrode and/or the negative electrode is the electrode for an all-solid-state secondary battery according to the present embodiment. More specifically, an all-solid-state secondary battery according to the present embodiment includes a positive electrode, a solid electrolyte layer, and a negative electrode, wherein the positive electrode includes a positive electrode active material, a polyimide-based resin as a positive binder resin, and a lithium salt having a solubility in water or at least one organic solvent at 25° C. of 0.1 g/100 g of solvent or more (preferably a lithium salt having a solubility in at least one organic solvent at 25° C. of 0.1 g/100 g of solvent or more and an ionic conductivity at 25° C. of 1×10⁻⁴ S/cm or more), and the positive electrode having a positive electrode active material layer that does not contain a solid electrolyte, on a current collector; or, the negative electrode includes a negative electrode active material, a polyimide-based resin as a negative binder resin, and a lithium salt having a solubility in water or at least one organic solvent at 25° C. of 0.1 g/100 g of solvent or more (preferably a lithium salt having a solubility in at least one organic solvent at 25° C. of 0.1 g/100 g of solvent or more and an ionic conductivity at 25° C. of 1×10⁻⁴ S/cm or more), and the negative electrode having a negative electrode active material layer that does not contain a solid electrolyte, on a current collector.

In the present embodiment, the lithium salt contained in the electrode active material layer is preferably a lithium salt that is in a solid state at 25° C.

Incidentally, if the electrode is employed as a positive electrode, an electrode active material and a binder resin included in the electrode are referred to as a positive electrode active material and a positive electrode binder resin, respectively, and an electrode active material layer and a current collector therein are referred to as a positive electrode active material layer and a positive electrode current collector, respectively. If the electrode is employed as a negative electrode, an electrode active material and a binder resin included therein are referred to as a negative electrode active material and a negative electrode binder resin, respectively, and an electrode active material layer and a current collector therein are referred to as a negative electrode active material layer and a negative electrode current collector, respectively. In addition, one of the positive electrode and the negative electrode may be referred to as an electrode, and the other may be referred to as a counter electrode. For example, if the electrode for an all-solid-state secondary battery of the present embodiment is employed as a positive electrode, the positive electrode may be referred to as the electrode, and the negative electrode may be referred to as the counter electrode. On the other hand, if the electrode for an all-solid-state secondary battery of the present embodiment is employed as a negative electrode, the negative electrode may be referred to as the electrode, and the positive electrode may be referred to as the counter electrode. In either case, however, the counter electrode may also be the electrode for an all-solid-state secondary battery of the present embodiment.

Hereinafter, an electrode for an all-solid-state secondary battery and an all-solid-state secondary battery according to the present embodiment will be described for each component.

<Electrode>

An electrode for an all-solid-state secondary battery according to the present embodiment includes: an electrode active material (a positive electrode active material or a negative electrode active material), a polyimide-based resin as a binder resin, and a lithium salt having a solubility in water or at least one organic solvent at 25° C. of 0.1 g/100 g of solvent or more (preferably a lithium salt having a solubility in at least one organic solvent at 25° C. of 0.1 g/100 g of solvent or more and an ionic conductivity at 25° C. of 1×10⁻⁴ S/cm or more); and the electrode has an electrode active material layer (a positive electrode active material layer or a negative electrode active material layer) that does not contain a solid electrolyte, on a current collector. The electrode active material layer may further contain a conductive auxiliary agent or other additives.

It is known that polyimide-based resins generally have almost no ionic conductivity. However, despite having almost no ionic conductivity, a polyimide-based resin used as a binder resin in an electrode active material layer, preferably with a lithium salt having a solubility in water or at least one organic solvent at 25° C. of 0.1 g/100 g of solvent or more, added to the electrode active material layer, can realize a practical all-solid-state secondary battery that can work without containing a solid electrolyte, which was an essential component for conventional electrodes for all-solid-state secondary batteries, contained in the electrode active material layer. In the present embodiment, a "solid electrolyte" not contained in an electrode active material layer means: a material that is in a solid state at least in an environment at one atmosphere pressure at 25° C. and serves as a supply source of ions that releases cations (Li ions) in a solid state; or a material that has ion transport function and functions as an electrolyte in a solid state, which is a commonly known and used inorganic solid electrolyte or polymer solid electrolyte. Incidentally, the electrode active material layer of the electrode for an all-solid-state secondary battery of the present embodiment contains a lithium salt, preferably a lithium salt that is in a solid state at 25° C., or it may contain a lithium-containing electrode active material.

<<Binder Resin>>

In the present embodiment, a polyimide-based resin is used as a binder resin. The polyimide-based resin as used herein refers to a polymer and oligomer containing at least one kind of repeating unit having an imide structure derived from a tetracarboxylic acid component (The tetracarboxylic acid component may include, in addition to tetracarboxylic acid, a tetracarboxylic acid derivative such as a tetracarboxylic dianhydride and a tetracarboxylic acid ester, but preferred is a tetracarboxylic dianhydride.) and a diamine component (The diamine component may include, in addition to a diamine, a diisocyanate or the like, but preferred is a diamine.). Examples of the polyimide-based resin may include polyamideimide, polyetherimide, and polyesterimide. The polyimide-based resin used in the present embodiment may be a partially imidized polyamic acid having an imidization ratio of less than 100%.

The polyimide-based resin used as a binder resin in the present embodiment is preferably, for example, a polyimide-based resin that includes a repeating unit represented by chemical formula (1) below, more preferably a polyimide-based resin composed of a repeating unit represented by chemical formula (1) below.

(1)

(In the formula, A represents a tetravalent group obtained by removing carboxyl groups from a tetracarboxylic acid, and B represents a divalent group obtained by removing amino groups from a diamine.)

In the chemical formula (1), A is one or more kinds of tetravalent groups obtained by removing carboxyl groups from a tetracarboxylic acid. Preferably, A is one or more kinds of tetravalent groups represented by any one of the chemical formulae (A-1) to (A-7) below. Particularly preferably, 10 to 100 mol %, preferably 15 to 70 mol %, more preferably 20 to 60 mol %, and particularly preferably 20 to 50 mol % of A is tetravalent groups represented by the chemical formula (A-1) below and 90 to 0 mol %, preferably 85 to 30 mol %, more preferably 80 to 40 mol %, and particularly preferably 80 to 50 mol % of A is tetravalent groups represented by the chemical formula (A-2) and/or the chemical formula (A-3) below.

B is one or more kinds of divalent groups obtained by removing amino groups from a diamine and is preferably one or more kinds of divalent groups having 1 to 4 aromatic rings. More preferably, B is one or more kinds of divalent groups represented by any one of the formulae (B-1) to (B-5) below. Particularly preferably, B is one or more kinds of divalent groups represented by any one of the formulae (B-1) to (B-3) below.

(A-1)

(A-2)

(A-3)

(A-4)

(A-5)

(A-6)

-continued (A-7)

(B-1)

(B-2)

(B-3)

(B-4)

(B-5)

Note that, in the chemical formula (B-3), X is a direct bond, an oxygen atom, a sulfur atom, a methylene group, a carbonyl group, a sulfoxyl group, a sulfonyl group, a 1,1'-ethylidene group, a 1,2-ethylidene group, a 2,2'-isopropylidene group, a 2,2'-hexafluoroisopropylidene group, a cyclohexylidene group, a phenylene group, a 1,3-phenylenedimethylene group, a 1,4-phenylenedimethylene group, a 1,3-phenylenediethylidene group, a 1,4-phenylenediethylidene group, a 1,3-phenylenedipropylidene group, a 1,4-phenylenedipropylidene group, a 1,3-phenylenedioxy group, a 1,4-phenylenedioxy group, a biphenylenedioxy group, a methylenediphenoxy group, an ethylidenediphenoxy group, a propylidenediphenoxy group, a hexafluoropropylidenediphenoxy group, an oxydiphenoxy group, a thiodiphenoxy group, or a sulfone diphenoxy group.

Examples of the tetracarboxylic acid component that can be suitably used to obtain the polyimide-based resin composed of the repeating unit represented by the chemical formula (1) include 4,4'-oxydiphthalic acids [tetracarboxylic acid components that provide a tetravalent group represented by the chemical formula (A-1)], 3,3',4,4'-biphenyltetracarboxylic acids [tetracarboxylic acid components that provide a tetravalent group represented by the chemical formula (A-2)], pyromellitic acids [tetracarboxylic acid components that provide a tetravalent group represented by the chemical formula (A-3)], 3,3',4,4'-diphenylsulfone tetracarboxylic acids [tetracarboxylic acid components that provide a tetravalent group represented by the chemical formula (A-4)], 3,3',4,4'-benzophenonetetracarboxylic acids [tetracarboxylic acid components that provide a tetravalent group represented by the chemical formula (A-5)], 2,3,3',4'-biphenyltetracarboxylic acids [tetracarboxylic acid components that provide a tetravalent group represented by the chemical formula (A-6)], 2,2',3,3'-biphenyltetracarboxylic acids [tetracarboxylic acid components that provide a tetravalent group represented by the chemical formula (A-7)], p-terphenyltetracarboxylic acids, and m-terphenyltetracarboxylic acids.

Examples of the diamine component that can be suitably used to obtain the polyimide-based resin composed of the repeating unit represented by the chemical formula (1) include an aromatic diamine having an aromatic ring such as p-phenylenediamine [a diamine component that provides a divalent group represented by the chemical formula (B-2)], m-phenylenediamine, 2,4-diaminotoluene, 2,4-bis(β-amino-tert-butyl)toluene, bis-p-(1,1-dimethyl-5-amino-pentyl)benzene, 1-isopropyl-2,4-m-phenylenediamine, m-xylylenediamine, p-xylylenediamine, 2,3-diaminobenzoic acid, 3,4-diaminobenzoic acid, and 3,5-diaminobenzoic acid; an aromatic diamine having two aromatic rings such as 4,4'-diaminodiphenyl ether [a diamine component that provide a divalent group represented by the chemical formula (B-1)], 3,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenylsulfone, 1,5-diaminonaphthalene, 3,3'-dimethyl-4,4'-biphenyldiamine, benzidine, 3,3'-dimethylbenzidine, 3,3'-dimethoxybenzidine, 4,4'-diaminodiphenylsulfone, 4,4'-diaminodiphenylpropane, bis(4-amino-3-carboxyphenyl)methane, and bis(p-β-amino-tert-butylphenyl)ether; an aromatic diamine having three aromatic rings such as 1,3-bis(4-aminophenoxy)benzene [a diamine component that provide a divalent group represented by the chemical formula (B-5)], 1,4-bis(4-aminophenoxy)benzene [a diamine component that provide a divalent group represented by the chemical formula (B-4)], and bis(p-β-methyl-6-aminophenyl)benzene; an aromatic diamine having four aromatic rings such as 2,2-bis[4-(4-aminophenoxy)phenyl]propane [a diamine component that provide a divalent group represented by the chemical formula (B-3) wherein X is a 2,2'-isopropylidene group], bis[4-(4-aminophenoxy)phenyl]sulfone [a diamine component that provide a divalent group represented by the chemical formula (B-3) wherein X is a sulfonyl group], and 4,4'-bis(4-aminophenoxy)biphenyl [a diamine component that provide a divalent group represented by the chemical formula (B-3) wherein X is a direct bond].

The polyimide-based resin used as a binder resin in the present embodiment may be preferably a polyimide-based resin in which at least one of the tetracarboxylic acid component or the diamine component, more preferably either the tetracarboxylic acid component or the diamine component, contains 50 mol % or more, more preferably 80 mol % or more of an aliphatic compound. For example, particularly preferred is a polyimide-based resin composed of the repeating unit represented by the chemical formula (1) in which A is one or more kinds of tetravalent groups having one or two aromatic rings and B is one or more kinds of divalent alkylene groups having 1 to 20 carbon atoms. In such polyimide-based resin, A is preferably one or more kinds of tetravalent groups represented by any one of the chemical formulae (A-1) to (A-3) and (A-6), B is preferably one or more kinds of alkylene groups having 3 to 16 carbon atoms, more preferably 3 to 14 carbon atoms. Incidentally, B may be a linear alkylene group or a branched alkylene group.

Examples of the tetracarboxylic acid component that can be suitably used to obtain such polyimide-based resin include aromatic tetracarboxylic acids such as 3,3',4,4'-biphenyltetracarboxylic acids, 2,3,3',4'-biphenyltetracarboxylic acids, 2,2',3,3'-biphenyltetracarboxylic acids, pyromellitic acids, benzophenone tetracarboxylic acids, 4,4'-oxydiphthalic acids, and diphenyl sulfone tetracarboxylic acids, p-terphenyltetracarboxylic acids, and m-terphenyltetracarboxylic acids. The examples thereof also include aliphatic tetracarboxylic acids such as butane-1,2,3,4-tetracarboxylic acids.

Examples of the diamine component that can be suitably used to obtain such polyimide-based resin include aliphatic diamines such as 1,2-propanediamine, 1,3-diaminopropane, 2-methyl-1,3-propanediamine, 1,4-diaminobutane, 1,3-diaminopentane, 1,5-diaminopentane, 2-methyl-1,5-diaminopentane, 1,6-diaminohexane (hexamethylenediamine), 1,7-diaminoheptane, 1,8-diaminooctane, 1,9-diaminononane, 1,10-diaminodecane, 1,11-diaminoundecane, and 1,12-diaminododecane. The examples thereof also include aromatic diamines such as p-phenylenediamine, m-phenylenediamine, 2,4-diaminotoluene, m-xylylenediamine, p-xylylenediamine, 4,4'-diaminodiphenyl ether, 3,4'-diaminodiphenyl ether, 4,4'-diaminodiphenylmethane, 3,3'-diaminodiphenylmethane, 3,4'-diaminodiphenylmethane, 4,4'-diaminodiphenyl sulfide, 4,4'-diaminodiphenylsulfone, 3,3'-diaminodiphenylsulfone, 1,5-diaminonaphthalene, bis(4-amino-3-carboxyphenyl)methane 1,3-bis(4-aminophenoxy)benzene, 1,4-bis(4-aminophenoxy)benzene, 2,2-bis[4-(4-aminophenoxy)phenyl]propane, bis[4-(4-aminophenoxy)phenyl]sulfone, and 4,4'-bis(4-aminophenoxy)biphenyl.

The polyimide-based resin used as a binder resin may be a commercially available product. Suitable examples of a commercially available product of the polyimide-based resin that includes the above-described structure of the chemical formula (1) include UPIA (registered trademark)-LB-1001, UPIA (registered trademark)-LB-2001, UPIA (registered trademark)-AT, and UPIA (registered trademark)-ST, which are manufactured by UBE Corporation.

The polyimide-based resin as a binder resin may be composed of a single kind of polyimide-based resin or two or more kinds thereof in combination.

In the electrode for an all-solid-state secondary battery according to the present embodiment, one or more other binder resins commonly used as a binder resin for electrodes may be used in combination with the polyimide-based resin above in a range that does not impair the properties of the present embodiment, preferably to an extent of less than 50% by mass, more preferably less than 30% by mass, and even more preferably less than 10% by mass. However, it is preferable not to contain a binder resin other than polyimide-based resins.

<<Electrode Active Material>>

An electrode active material used in a positive electrode (a positive electrode active material) of an all-solid-state secondary battery of the present embodiment may be any known one as long as lithium-ions can be reversibly inserted thereto and released therefrom. The positive electrode active material may be composed of a single kind of positive electrode active material or two or more kinds thereof in combination.

Examples of the positive electrode active material include transition metal oxides that contain lithium and one or more transition metal elements selected from the group consisting of Co, Ni, Fe, Mn, Cu and V. In addition, the positive electrode active material may be a transition metal oxide in which a part of the transition metal elements is substituted with an element selected from the elements of Group 1 (Ia) excluding lithium, the elements of Group 2 (IIa), Al, Ga, In, Ge, Sn, Pb, Sb, Bi, Si, P, B and the like of the periodic table.

More specifically, examples include: (1) a transition metal oxide having a layered rock salt type structure, (2) a transition metal oxide having a spinel type structure, (3) a lithium-containing transition metal phosphate compound, (4) a lithium-containing transition metal halogenated phosphate compound, and (5) a lithium-containing transition metal silicic acid compound. Among them, the positive electrode active material may preferably be (1) the transition metal oxide having a layered rock salt type structure.

Examples of (1) the transition metal oxide having a layered rock salt type structure include $LiCoO_2$ (lithium cobalt oxide [LCO]), $LiNi_2O_2$ (lithium nickel oxide), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobaltate [NMC]), and $LiNi_{0.5}Mn_{0.5}O_2$ (lithium manganese nickelate).

Examples of (2) the transition metal oxide having a spinel type structure include $LiMn_2O_4(LMO)$, $LiCoMnO_4$, $Li_2FeMn_3O_8$, $Li_2CuMn_3O_8$, $Li_2CrMn_3O_8$, and $Li_2NiMn_3O_8$.

Examples of (3) the lithium-containing transition metal phosphate compound include olivine-type iron phosphate salts such as $LiFePO_4$ and $Li_3Fe_2 (PO_4)_3$; iron pyrophosphates such as $LiFeP_2O_7$; cobalt phosphates such as $LiCoPO_4$; and monoclinic nasicon-type vanadium phosphate salts such as $Li_3V_2 (PO_4)_3$ (lithium vanadium phosphate).

Examples of (4) the lithium-containing transition metal halogenated phosphate compound include iron fluorophosphates such as $Li_2FePO_4F$, manganese fluorophosphates such as such as $Li_2MnPO_4F$, and cobalt fluorophosphates such as $Li_2CoPO_4F$.

Examples of (5) the lithium-containing transition metal silicic acid compound include $Li_2FeSiO_4$, $Li_2MnSiO_4$, and $Li_2CoSiO_4$.

The mean particle diameter of the positive electrode active material is not particularly limited, but usually it is preferably 0.1 to 50 μm.

An electrode active material used in a negative electrode (a negative electrode active material) of an all-solid-state secondary battery of the present embodiment may be any known one as long as lithium-ions can be reversibly inserted thereto and released therefrom. Any known negative electrode active material can be used. The negative electrode active material may be composed of a single kind of negative electrode active material or two or more kinds thereof in combination.

Examples of the negative electrode active material include carbonaceous materials; metal oxides such as tin oxides and silicon oxides; metal composite oxides; lithium simple substance; lithium alloys such as lithium-aluminum alloys; and metals that can be alloyed with lithium such as Sn and Si. Among them, the negative electrode active material is preferably a carbonaceous material or a lithium composite oxide. The metal composite oxide may be any type, but preferably it contains titanium and/or lithium.

The carbonaceous materials used as the negative electrode active material are substantially composed of carbon. Examples thereof include carbon black such as petroleum pitch and acetylene black (AB); natural graphite; artificial graphite such as vapor phase grown graphite; and carbonaceous materials formed by calcination of synthetic resins such as PAN (polyacrylonitrile)-based resin and furfuryl alcohol resin. The examples thereof also include various types of carbon fibers such as PAN-based carbon fiber, cellulosic-based carbon fiber, pitch-based carbon fiber, vapor grown carbon fiber, dehydrated PVA (polyvinyl alcohol)-based carbon fiber, lignin carbon fiber, glassy carbon fiber, and activated carbon fiber, mesophase microspheres, graphite whisker, and flat graphite.

Among the metal oxides and metal composite oxides used as the negative electrode active material, particularly preferred are amorphous oxides. Chalcogenites, which are reaction products of a metal element and an element in Group 16 of the periodic table are also preferable. Among the group of compounds consisting of amorphous oxides and chalcogenites, preferred are amorphous oxides and chalcogenides of metalloid elements. More preferred are oxides and chalcogenides composed of one selected from the group consisting of Al, Ga, Si, Sn, Ge, Pb, Sb and Bi, which are elements in Groups 13(IIIB) to 15(VB) of the periodic table, or two or more selected therefrom in combination. Examples of preferred amorphous oxides and chalcogenides include $Ga_2O_3$, $SiO$, $GeO$, $SnO$, $SnO_2$, $PbO$, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, $GeS$, $SnS$, $SnS_2$, $PbS$, $PbS_2$, $Sb_2S_3$, $Sb_2S_5$, and $SnSiS_3$. These may also be a composite oxide with lithium oxide such as $Li_2SnO_2$.

A negative electrode active material that contains a titanium atom is also preferable. Examples of the negative electrode active material containing a titanium atom include $Li_4Ti_5O_{12}$ (lithium titanate [LTO]).

Further, it is also preferable to use a negative electrode active material that contains Si element. In general, a negative electrode using a negative electrode active material that contains Si element can occlude more Li ions, so that the battery capacity can be increased compared to conventional negative electrodes using carbon (graphite, acetylene black, etc.) as a negative electrode active material.

The mean particle diameter of the negative electrode active material is not particularly limited, but usually it is preferably 0.1 to 60 μm.

<<Lithium Salt>>

A lithium salt used in the electrode for an all-solid-state secondary battery of the present embodiment has a solubility in water or at least one organic solvent at 25° C. of 0.1 g/100 g of solvent (the solvent is the water or at least one the organic solvent) or more.

Specific examples of the organic solvent include nitrogen-containing organic solvents such as N-methyl-2-pyrrolidone, N-ethyl-2-pyrrolidone, N,N-dimethylacetamide, N,N-dimethylformamide, N,N-diethylacetamide, 1,3-dimethyl-2-imidazolidinone, N-methylformamide, N,N-dimethylpropionamide, N,N-dimethylisobutylamide, and tetramethylurea; polar solvents as typified by alcohol-based organic solvents such as methanol, and ethanol; hydrocarbon-based organic solvents such as pentane, hexane, heptane, xylene, toluene, and ethylbenzene; aromatic-based organic solvents such as phenol, o-cresol, m-cresol, and p-cresol; non-polar solvents as typified by ester-based organic solvents such as butyl acetate, ethyl acetate, isobutyl acetate, ethyl propionate, ethyl butyrate, butyl butyrate, butyl benzoate, ethyl benzoate, methyl benzoate, dimethyl carbonate, and diethyl carbonate.

The lithium salt used in the electrode for an all-solid-state secondary battery of the present embodiment preferably has a solubility at 25° C. of 0.2 g/100 g solvent or more. Usually, the more the solubility increases like 1 g/100 g of solvent or more, 2 g/100 g of solvent or more, 5 g/100 g of solvent or more, 10 g/100 g of solvent or more, 30 g/100 g of solvent or more and 50 g/100 g of solvent or more, the more preferable it is. In particular, a lithium salt that has a high solubility in at least one selected from the group consisting of water, a nitrogen-containing organic solvent, an alcohol-based organic solvent, and an ester-based organic solvent or preferably in all of them, can improve the properties of the all-solid-state battery synergistically in combination with the polyimide-based resin as a binder resin.

Incidentally, there is no upper limit to the solubility of the lithium salt in water or an organic solvent at 25° C., and usually a higher solubility is preferable. However, the upper limit value is preferably 220 g/100 g of solvent (the solvent is the water or at least one the organic solvent) or less, more preferably 200 g/100 g of solvent or less, and still more preferably 180 g/100 g of solvent or less, for example.

A lithium salt used in the electrode for an all-solid-state secondary battery of the present embodiment preferably has an ionic conductivity at 25° C. of $1\times10^{-5}$ S/cm or more, more preferably $1\times10^{-4}$ S/cm or more, and still more preferably $1\times10^{-3}$ S/cm or more. There is no upper limit to the ionic conductivity of the lithium salt, but usually the upper limit value is preferably 1 S/cm or less, more preferably $5\times10^{-1}$ S/cm or less, even more preferably $1\times10^{-1}$ S/cm or less, further more preferably $1.5\times10^{-2}$ S/cm or less, yet further more preferably $1\times10^{-2}$ S/cm or less.

Incidentally, the ionic conductivity of a lithium salt can be measurement by the AC impedance measurement. For example, the ionic conductivity of a lithium salt can be measured in accordance with the method described in "Electrochemical measurement Manual, Basic Edition, 2002, 45, edited by The Electrochemical Society of Japan, published by Maruzen Co., Ltd." Specifically, a glass electrochemical cell with platinum electrodes facing each other is filled with a standard solution of which electric conductivity is known, to calculate the cell constant in advance. Then, a prepared lithium salt solution (solvent: propylene carbonate, solution concentration: 1 mol/dm³) is poured into the electrochemical cell and the cell is sealed. The thus prepared electrochemical cell is allowed to stand in a thermostatic bath at 20° C. for 1 hour, and then the solution-resistance is measured by the complex impedance method. The ionic conductivity of the solution can be calculated from the solution resistance value obtained. In the present embodiment, the thus measured ionic conductivity of the solution is treated as the ionic conductivity of the lithium salt.

The lithium salt used in the electrode for an all-solid-state secondary battery of the present embodiment is preferably in a solid state at 25° C.

The lithium salt may be composed of a single kind of lithium salt or two or more kinds thereof in combination.

The lithium salt used in the electrode for an all-solid-state secondary battery of the present embodiment may be of any type. Examples thereof include inorganic lithium salts such as inorganic fluorides including $LiPF_6$, $LiBF_4$, $LiAsF_6$, and $LiSbF_6$; perhalogen acid salts such as $LiClO_4$, $LiBrO_4$, and $LiIO_4$; inorganic lithium salts such as inorganic chloride salts including $LiAlCl_4$; perfluoroalkane sulfonates such as $LiCF_3SO_3$; $LiN(FSO_2)_2$; perfluoroalkane sulfonylimide salts such as $LiN(CF_3SO_2)_2$, $LiN(CF_3CF_2SO_2)_2$, and $LiN(CF_3SO_2)(C_4F_9SO_2)$; perfluoroalkane sulfonylmethides such as $LiC(CF_3SO_2)_3$; fluorine-containing organic lithium salts such as fluoroalkyl fluoride phosphates including $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$; oxalatoborate salts such as lithium bis(oxalato)borate, and lithium difluorooxalatoborate.

Among them, the lithium salt used in the electrode for an all-solid-state secondary battery is preferably $LiN(FSO_2)_2$; or perfluoroalkanesulfonylimides salt such as $LiN(CF_3SO_2)_2$, $LiN(CF_3CF_2SO_2)_2$, and $LiN(CF_3SO_2)(C_4F_9SO_2)$; or both from the viewpoint of stability in polar solvents. As a specific example, the lithium salt used in the electrode for an all-solid-state secondary battery is preferably at least one selected from the group consisting of $LiN(FSO_2)_2$, $LiN(CF_3SO_2)_2$, $LiN(CF_3CF_2SO_2)_2$, and $LiN(CF_3SO_2)(C_4F_9SO_2)$.

These lithium salts each have a solubility in water or at least one organic solvent at 25° C. of 0.1 g/100 g of solvent (the solvent is the water or at least one the organic solvent) or more.

<<Electrode Active Material Layer>>

An electrode active material layer of the electrode for an all-solid-state secondary battery according to the present embodiment includes a binder resin containing a polyimide-based resin, an electrode active material, and a lithium salt having a solubility in water or at least one organic solvent at 25° C. of 0.1 g/100 g of solvent or more (preferably a lithium salt having a solubility in at least one organic solvent at 25° C. of 0.1 g/100 g of solvent or more and an ionic conductivity at 25° C. of $1\times10^{-4}$ S/cm or more), as described above.

In the case where the electrode is employed as a positive electrode, the electrode active material layer may contain any amount of positive electrode active material, but usually the amount is preferably 10 to 95% by mass, and more preferably 55 to 80% by mass.

In the case where the electrode is employed as a negative electrode, the electrode active material layer may contain any amount of negative electrode active material, but usually the amount is preferably 10 to 80% by mass, and more preferably 20 to 70% by mass.

The electrode active material layer may contain any amount of lithium salt (a lithium salt having a solubility in water or at least one organic solvent at 25° C. of 0.1 g/100 g of solvent or more), but usually the amount is preferably 0.1 to 30% by mass, and more preferably 0.5 to 20% by mass.

The electrode active material layer may further contain a conductive auxiliary agent as appropriate. Conductive auxiliary agents improve the electrical conductivity of electrons. Herein, any one of conductive auxiliary agents generally used in all-solid-state secondary batteries may be used.

Examples of the conductive auxiliary agent include graphite such as natural graphite and artificial graphite; carbon black such as acetylene black, ketjen black, and furnace black; amorphous carbon such as needle coke; carbon fibers such as vapor grown carbon fiber, and carbon nanotubes; carbonaceous materials such as graphene, and fullerene; metal powders of copper or nickel and metal fibers of copper or nickel; conductive polymers such as polyaniline, polypyrrole, polythiophene, polyacetylene, and polyphenylene derivatives. The conductive auxiliary agent may be composed of a single kind of conductive auxiliary agent or two or more kinds thereof in combination.

The amount of the conductive auxiliary agent contained in the electrode active material layer is not particularly limited, but usually it is preferably 5% by mass or less.

The electrode active material layer may further contain additives such as a surfactant for improving coatability as appropriate.

The electrode active material layer may have any thickness, but usually the thickness is preferably 1 to 1000 μm, more preferably 3 to 500 μm, for both the positive electrode and the negative electrode.

The mass (mg) of the positive electrode active material contained in the electrode active material layer per unit area (cm²) (basis weight) is not particularly limited and may be appropriately selected depending on a desired battery capacity. The mass (mg) of the negative electrode active material contained in the electrode active material layer per unit area (cm$^2$) (basis weight) is not particularly limited and may be appropriately selected depending on a desired battery capacity.

<<Current Collector>>

A current collector used in the electrode for an all-solid-state secondary battery of the present embodiment is preferably an electronic conductor that does not undergo a chemical change.

Examples of the material for forming a current collector of the positive electrode include aluminum, aluminum alloys, stainless steel, nickel, and titanium. In addition, the current collector of the positive electrode may be made of aluminum, an aluminum alloy or stainless steel that is surface-treated with carbon, nickel, titanium, silver or the like (to form a thin film thereon). Among them, the current collector of the positive electrode is preferably made of aluminum or an aluminum alloy.

Examples of the material for forming a current collector of the negative electrode include aluminum, copper, copper alloys, stainless steel, nickel, and titanium. In addition, the current collector of the negative electrode may be made of aluminum, copper, a copper alloy or stainless steel that is surface-treated with carbon, nickel, titanium, silver or the like (to form a thin film thereon). Among them, the current collector of the negative electrode is preferably made of aluminum, copper, a copper alloy, or stainless steel. As the stainless steel, nickel-plated steel may be suitably used, for example.

The current collector usually has a foil-like shape (a shape like a film sheet), but may be in the form of a net, a porous body or a fiber molded body, or may be punched. In addition, the current collector may be surface-treated to have an uneven surface.

The current collector may have any thickness, but usually the thickness is preferably 1 to 500 μm.

<<Method for Producing an Electrode>>

The electrode for an all-solid-state secondary battery of the present embodiment can be produced by preparing an electrode mixture paste that includes an electrode active material, a polyimide-based resin or a precursor thereof as a binder resin, a lithium salt with a solubility in water or at least one organic solvent at 25° C. of 0.1 g/100 g of solvent or more, and a solvent, and the electrode mixture paste containing no solid electrolyte; applying the electrode mixture paste on a current collector; and then drying or heat treating it to form an electrode active material layer. The electrode mixture paste can be prepared by mixing and slurrying the electrode active material, the binder resin or the precursor thereof, the lithium salt, and the solvent.

Exemplary methods for producing an electrode using a polyimide-based resin as a binder resin will be schematically described below.

(1) Method for producing an electrode by adding an electrode active material, lithium salt, a conductive auxiliary agent, etc. to a polyimide precursor (in particular, polyamic acid) and selectively adding an imidization catalyst, an organophosphorus-containing compound, a dehydrating agent, etc. to the polyimide precursor as needed to form a polyimide precursor solution composition (an electrode mixture paste); applying the composition on a current collector; and heating it for cyclodehydration and desolvation to convert the polyimide precursor to polyimide to form an electrode active material layer on the current collector (thermal imidization);

(2) Method for producing an electrode by adding an electrode active material, a lithium salt, a conductive auxiliary agent, etc. to a polyimide precursor (in particular, polyamic acid), further adding a cyclization catalyst and a dehydrating agent thereto to form a polyimide precursor solution composition (an electrode mixture paste), applying the polyimide precursor solution composition on a current collector and chemically cyclodehydrating it, and heating it for desolvation and imidization to convert the polyimide precursor to polyimide to form an electrode active material layer on the current collector (chemical imidization).

(3) In the case where the polyimide is soluble in an organic solvent, a method for producing an electrode by adding an electrode active material, a lithium salt, a conductive auxiliary agent, etc. to a polyimide solution to form a polyimide solution composition (an electrode mixture paste), casting the polyimide solution composition on a current collector; and removing the solvent by heating or the like to form an electrode active material layer.

First, the producing of the polyimide precursor solution and the polyimide solution will be described. The polyimide precursor solution or polyimide solution may be obtained by polymerizing approximately equimolar amounts of tetracarboxylic acid component and diamine components in an organic solvent or water. The polymerization is suitably carried out by preferably dissolving the diamine component in a solvent (an organic solvent or water) to obtain a solution; adding the tetracarboxylic acid component to the solution at one time or in multiple stages; and heating it to allow the reaction therebetween.

The molar ratio between the tetracarboxylic acid component and the diamine component (the molar ratio of the tetracarboxylic acid component to the diamine component [the tetracarboxylic acid component/the diamine component]) is preferably an approximately equimolar ratio, specifically, 0.95 to 1.05, preferably 0.97 to 1.03.

As an alternative method, two or more kinds of polyimide precursors in which either component is excessive are synthesized in advance, and the polyimide precursor solutions may be combined and then mixed under reaction conditions.

Examples of the organic solvent include amide solvents such as N,N-dimethylformamide, N,N-dimethylacetamide, N,N-diethylacetamide, N-methyl-2-pyrrolidone, N-ethyl-2-pyrrolidone, and N-vinyl-2-pyrrolidone, cyclic ester solvents such as γ-butyrolactone, γ-valerolactone, δ-valerolactone, γ-caprolactone, ε-caprolactone, and α-methyl-γ-butyrolactone, carbonate solvents such as ethylene carbonate, and propylene carbonate, glycol-based solvents such as triethylene glycol, phenolic-based solvents such as phenol, o-cresol, m-cresol, p-cresol, 3-chlorophenol, 4-chlorophenol, acetophenone, 1,3-dimethyl-2-imidazolidinone, sulfolane, and dimethyl sulfoxide. In addition, other common organic solvents can also be used. Examples thereof include alcoholic solvents such as methanol, ethanol, and butanol, ester-based solvents such as butyl acetate, ethyl acetate, isobutyl acetate, ethyl propionate, ethyl butyrate, butyl butyrate, butyl benzoate, ethyl benzoate, and methyl benzoate, propylene glycol methyl acetate, ethylcellosolve, butylcellosolve 2-methylcellosolve acetate, ethylcellosolve acetate, butylcellosolve acetate, tetrahydrofuran, dimethoxyethane, diethoxyethane, dibutyl ether, diethylene glycol dimethyl ether, methylisobutyl ketone, diisobutyl ketone, cyclopentanone, cyclohexanone, methyl ethyl ketone, acetone, xylene, toluene, chlorobenzene, N-methylcaprolactam, hexamethylphosphorotriamide, bis(2-methoxyethyl)ether, 1,2-bis(2-methoxyethoxy)ethane, bis

[2-(2-methoxyethoxy)ethyl]ether, 1,4-dioxane, dimethyl sulfoxide, dimethylsulfone, diphenyl ether, diphenyl sulfone, tetramethylurea, anisole, turpentine, mineral spirits, petroleum naphtha-based solvents, biodegradable methyllactate, biodegradable ethyl lactate, biodegradable butyl lactate and others. The organic solvent to be used may be composed of a single kind of organic solvent or two or more kinds thereof in combination.

When water is used as a solvent, it is preferable that a base selected from, for example, imidazoles such as 1,2-dimethylimidazole; and triethylamine be added in an amount of 0.8 times equivalent or more to that of carboxyl groups in a polyamic acid (polyimide precursor) to be produced.

When carrying out the polymerization reaction to obtain the polyimide precursor solution or the polyimide solution, the concentration of all the monomers in the organic solvent (which is substantially equal to the solid concentration of the polyimide precursor solution or the polyimide solution) may be appropriately selected depending on the type of the monomers to be used and the like. The solid concentration of the obtained polyimide precursor solution or polyimide solution is not particularly limited, but it is preferably 3 to 45% by mass, more preferably 5 to 40% by mass, and still more preferably 7 to 30% by mass with respect to the total amount of the solvent and the polyimide precursor or polyimide. The solid content concentration of less than 3% by mass may worsen productivity and handleability during use, whereas the solid content concentration of more than 45% by mass may reduce the fluidity of the solution, which may make it difficult to uniformly apply the solution on a current collector. Setting the solid content concentration within the ranges described above can effectively prevent an occurrence of these defects.

The solution viscosity at 30° C. of the polyimide precursor solution or the polyimide solution is not particularly limited, but it is preferably 1000 Pa·s or less, more preferably 0.1 to 500 Pa·s, even more preferably 0.1 to 300 Pa·s, particularly preferably 0.1 to 200 Pa·s in terms of handleability. The solution viscosity of more than 1000 Pa·s may reduce the fluidity of the solution, which may make it difficult to uniformly apply the solution on a current collector. On the other hand, the solution viscosity of lower than 0.1 Pa·s may cause sagging or cissing when applying the solution on a current collector or may make it difficult to obtain an electrode active material layer and electrode with high properties. Setting the solution viscosity within the ranges described above can effectively prevent an occurrence of these defects.

As an example of a method for producing a polyimide precursor solution, polymerization reaction between the tetracarboxylic acid component and the diamine component is carried out in a manner where: the tetracarboxylic acid component is mixed with the diamine component, e.g. in substantially equimolar amounts or in amounts in which either component (the acid component or the diamine component) is slightly more than the other; and the mixture is subject to reaction, e.g. at a reaction temperature of 100° C. or lower, preferably 80° C. or lower for about 0.2 to 60 hours. Thus, a polyimide precursor solution can be obtained.

As an example of a method for producing a polyimide solution, polymerization reaction between the tetracarboxylic acid component and the diamine component is carried out in a manner where: the tetracarboxylic acid component is mixed with the diamine component, e.g. in substantially equimolar amounts or in amounts in which either component (the acid component or the diamine component) is slightly more than the other; and the mixture is subject to reaction in a known manner, e.g. at a reaction temperature of 120° C. or higher, preferably 140° C. or higher, or more preferably 160° C. or higher (preferably 250° C. or lower, or more preferably 230° C. or lower) for about 0.5 to 60 hours. Thus, a polyimide solution can be obtained.

Incidentally, the polymerization reaction may be carried out in an air atmosphere, but it is usually carried out in an inert gas atmosphere (for example, in an argon gas atmosphere, in a helium gas atmosphere or in a nitrogen gas atmosphere), preferably in a nitrogen gas atmosphere.

The thus obtained polyimide precursor solution or polyimide solution can be used as it is or after removing the solvent or newly adding the solvent as required, to form an electrode active material layer or to produce an electrode.

In the case of thermal imidization [the method (1)], an imidization catalyst, an organophosphorus-containing compound and the like may be added to the polyimide precursor solution as necessary. In the case of chemical imidization [the method (2)], a cyclization catalyst, a dehydrating agent and the like may be added to the polyimide precursor solution as necessary.

Suitable examples of the imidization catalyst include substituted or unsubstituted nitrogen-containing heterocyclic compounds; N-oxide compounds of the nitrogen-containing heterocyclic compounds; substituted or unsubstituted amino acid compounds; aromatic hydrocarbon compounds or aromatic heterocyclic compounds that have a hydroxyl group, and particularly, lower alkylimidazoles such as 1,2-dimethylimidazole, N-methylimidazole, 2-methylimidazole, 2-ethyl-4-methylimidazole, and N-benzyl-2-methylimidazole; benzimidazoles such as 5-methylbenzimidazole; substituted pyridines such as isoquinoline, 3,5-dimethylpyridine, 3,4-dimethylpyridine, 2,5-dimethylpyridine, 2,4-dimethylpyridine, and 4-n-propylpyridine. The imidization catalyst is preferably used in an amount about 0.01 to 2 times equivalent, particularly preferably about 0.02 to 1 times equivalent, to that of the amic acid unit of the polyamide acid.

Examples of the organophosphorus-containing compound include phosphate esters such as monocaproyl phosphate ester, monooctyl phosphate ester, monolauryl phosphate ester, monomyristyl phosphate ester, monocetyl phosphate ester, monostearyl phosphate ester, monophosphate ester of triethylene glycol monotridecyl ether, monophosphate ester of tetraethylene glycol monolauryl ether, monophosphate ester of diethylene glycol monostearyl ether, dicaproyl phosphate ester, dioctyl phosphate ester, dicapryl phosphate ester, dilauryl phosphate ester, dimyristyl phosphate ester, dicetyl phosphate ester, distearyl phosphate ester, diphosphate ester of tetraethylene glycol mononeopentyl ether, diphosphate ester of triethylene glycol monotridecyl ether, diphosphate ester of tetraethylene glycol monolauryl ether, diphosphate ester of diethylene glycol monostearyl ether, and amine salts of these phosphate esters. Examples of the amine include ammonia, monomethylamine, monoethylamine, monopropylamine, monobutylamine, dimethylamine, diethylamine, dipropylamine, dibutylamine, trimethylamine, triethylamine, tripropylamine, tributylamine, monoethanolamine, diethanolamine, and triethanolamine.

Examples of the cyclization catalyst include aliphatic tertiary amines such as trimethylamine, and triethylenediamine; aromatic tertiary amines such as dimethylaniline; and heterocyclic tertiary amines such as isoquinoline, pyridine, α-picoline, and β-picoline.

Examples of the dehydrating agent include aliphatic carboxylic anhydrides such as acetic anhydride, propionic anhydride, butyric anhydride; and aromatic carboxylic anhydrides such as benzoic anhydride.

In the producing of the electrode, the electrode active material and the lithium salt are added to the thus obtained polyimide precursor solution or polyimide solution and a conductive auxiliary agent or other additives are further added as needed to be mixed together to prepare an electrode mixture paste. The prepared electrode mixture paste is cast or applied on a current collector and is subject to heat treatment conducted preferably under pressure to imidize and remove the solvent (in the case of the polyimide solution, mainly to remove the solvent) to form an electrode active material layer on the current collector. Thus, the electrode can be produced.

The electrode mixture paste may be casted on a current collector by any method, such as conventionally known methods including spin coating, screen printing, a bar coater, and electrodeposition.

When the polyimide precursor solution is used, the heat treatment may be carried out in any conditions, but preferably the paste is firstly dried at a temperature ranging from 50 to 150° C. and then heat-treated with a maximum heating temperature of, e.g., 150 to 600° C., preferably 200 to 550° C., and more preferably 250 to 500° C. When the polyimide solution is used, the heat treatment may be carried out in any conditions, and the maximum heating temperature is, for example, 100 to 600° C., preferably 150 to 500° C. and more preferably 200 to 450° C.

Incidentally, the heat treatment may be carried out in an air atmosphere, but it is preferred that it is usually carried out in an inert gas atmosphere (e.g., in an argon gas atmosphere, in a helium gas atmosphere, or in a nitrogen gas atmosphere), and preferably in a nitrogen gas atmosphere.

<All-Solid-State Secondary Battery>

An all-solid-state secondary battery according to the present embodiment includes a positive electrode, a negative electrode, and a solid electrolyte layer disposed therebetween, and the positive electrode and/or the negative electrode is the above-described electrode for an all-solid-state secondary battery of the present embodiment. More specifically, the all-solid-state secondary battery of the present embodiment has a negative electrode current collector, a negative electrode active material layer, a solid electrolyte layer, a positive electrode active material layer, and a positive electrode current collector in this order, and the negative electrode active material layer and/or the positive electrode active material layer does not contain a solid electrolyte. As will be described later, if the positive electrode is the electrode for an all-solid-state secondary battery of the present embodiment, the negative electrode may not be the electrode for an all-solid-state secondary battery of the present embodiment. The negative electrode may be, for example, a carbonaceous material sheet, a metal foil or the like. In such a case, the all-solid-state secondary battery of the present embodiment may include a negative electrode, a solid electrolyte layer, a positive electrode active material layer that does not contain a solid electrolyte, and a positive electrode current collector in this order. On the other hand, if the negative electrode is the electrode for all-solid-state secondary battery of the present embodiment, the positive electrode may not be the electrode for all-solid-state secondary battery of the present embodiment. The positive electrode may be, for example, a metal foil such as a lithium-foil, or the like. In this case, the all-solid-state secondary battery of the present embodiment may include a negative electrode current collector, a negative electrode active material layer that does not contain a solid electrolyte, a solid electrolyte layer, a positive electrode in this order.

The all-solid-state secondary battery of the present embodiment may appropriately include a functional layer, member or the like in addition to the negative electrode (the negative electrode current collector and the negative electrode active material layer), the solid electrolyte layer, and the positive electrode (the positive electrode active material layer and the positive electrode current collector). Each layer may be composed of a single layer or multiple layers. For example, in a form of a dry battery, a negative electrode (a negative electrode current collector and a negative electrode active material layer), a solid electrolyte layer, and a positive electrode (a positive electrode active material layer and a positive electrode current collector), which are the basic structure of an all-solid-state secondary battery, are enclosed in a suitable housing. The housing may be made of metal such as an aluminum alloy or stainless steel, or may be made of resin (plastic). Preferably, the metallic housing is divided into a housing on the positive electrode side and a housing on the negative electrode side; and the positive electrode housing is electrically coupled to a positive electrode current collector, and the negative electrode housing is electrically coupled to a negative electrode current collector. The housing on the positive electrode side and the housing on the negative electrode side are preferably joined and integrated with each other via a gasket for preventing a short circuit.

<<Solid Electrolyte Layer>>

The solid electrolyte layer of the all-solid-state secondary battery of the present embodiment is a layer containing a solid electrolyte.

Preferably, the solid electrolyte layer is a layer composed of, for example, a polymer solid electrolyte (an intrinsic polymer solid electrolyte consisting of solid polymers). The polymer solid electrolyte may be any known polymer solid electrolyte such as polyethylene oxide-based polymers, polypropylene oxide-based polymers, perfluorocarbon sulfonic acid-based polymers, sulfonated polyetheretherketones, sulfonated polyethersulfones, and other aromatic hydrocarbon polymer electrolytes having an ionic group.

In addition, a suitable example of the solid electrolyte layer is a composite electrolyte membrane whose pores in a porous substrate are filled with a crosslinked aromatic polymer electrolyte in which aromatic hydrocarbon polymer electrolytes having an ionic group are linked at a site other than the ionic group by one or more crosslinking components, such as described in JP-A-2015-165461.

It is also preferred that the solid electrolyte layer of the all-solid-state secondary battery of the present embodiment be an inorganic solid electrolyte layer containing an inorganic solid electrolyte and a binder resin (a solid electrolyte layer binder resin). Hereinafter, the inorganic solid electrolyte layer will be described.

<<Inorganic Solid Electrolyte Layer>>

The solid electrolyte layer may contain any amount of inorganic solid electrolyte, but usually the amount of the inorganic solid electrolyte in the solid electrolyte layer is preferably 80 to 99.9% by mass, more preferably 90 to 99.7% by mass, and still more preferably 95 to 99.5% by mass.

The solid electrolyte layer may contain any amount of binder resin, but usually the amount of the binder resin in the solid electrolyte layer is preferably 0.1 to 20% by mass, more preferably 0.3 to 10% by mass, and even more preferably 0.5 to 5% by mass.

The solid electrolyte layer may also contain one or more kinds of lithium salt as necessary. The lithium salt may be of any type, and any one of known lithium salts generally used in all-solid-state secondary batteries may be used. Examples of the lithium salt include inorganic lithium salts, fluorine-containing organic lithium salts, and oxalatoborate salts. Specific examples of the lithium salt include inorganic fluorides such as $LiPF_6$, $LiBF_4$, $LiAsF_6$, and $LiSbF_6$; per-halogenates such as $LiClO_4$, $LiBrO_4$, and $LiIO_4$; and inorganic lithium salts such as inorganic chloride salts including $LiAlCl_4$; perfluoroalkane sulfonates such as $LiCF_3SO_3$; per-fluoroalkanesulfonylimides salt such as $LiN(FSO_2)_2$, $LiN(CF_3SO_2)_2$, $LiN(CF_3CF_2SO_2)_2$, and $LiN(CF_3SO_2)(C_4F_9SO_2)$; perfluoroalkane sulfonylmethides such as $LiC(CF_3SO_2)_3$; fluorine-containing organic lithium salts such as fluoroalkyl fluoride phosphates including $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$; oxalatoborate salts such as lithium bis(oxalato)borate, and lithium difluoroox-alatoborate.

The amount of the lithium salt in the solid electrolyte layer is not particularly limited, but usually it is preferably more than 0 parts by mass, more preferably 0.1 to 10 parts by mass, and even more preferably 0.5 to 5 parts by mass, with respect to 100 parts by mass of the inorganic solid electrolyte.

The solid electrolyte layer may have any thickness, but usually the thickness is preferably 1 to 1000 μm, and more preferably 3 to 500 μm.

<<<Inorganic Solid Electrolyte>>>

The inorganic solid electrolyte used in the solid electrolyte layer may be of any type as long as the inorganic solid electrolyte contains a metal belonging to Group 1 or 2 of the periodic table (preferably, lithium) and has conductivity of ions of the metal (preferably, lithium ions). Any one of known inorganic solid electrolytes used in all-solid-state secondary batteries may be used. The inorganic solid electrolyte may be composed of a single kind of inorganic solid electrolyte or two or more kinds thereof in combination.

Examples of the inorganic solid electrolyte include (1) sulfide-based inorganic solid electrolytes, and (2) oxide-based inorganic solid electrolytes.

Among (1) the sulfide-based inorganic solid electrolytes, preferred are those that contain a sulfur atom (S) and a metal belonging to Group 1 or Group 2 of the periodic table, and has ionic conductivity and electronic insulating property. Examples of the sulfide-based inorganic solid electrolytes include those represented by the following formula:

$$Li_aM_bP_cS_d$$

(wherein M is an element selected from the group consisting of B, Zn, Sn, Si, Cu, Ga, Sb, Al, and Ge; a to d represent the compositional ratio of the elements; and a:b:c:d=1 to 12:0 to 1:1:2 to 9, preferably a:b:c:d=1 to 9:0:1:3 to 7, more preferably a:b:c:d=1.5 to 4:0:1:3.25 to 4.5).

The ratio (molar ratio) of $Li_2S$ to $P_2S_5$ in a Li—P—S system solid electrolyte containing Li, P, and S is preferably $Li_2S:P_2S_5$=60:40 to 90:10, more preferably $Li_2S:P_2S_5$=68:32 to 78:22.

The sulfide-based inorganic solid electrolytes may be amorphous, crystallized, or partially crystallized.

Examples of the sulfide-based inorganic solid electrolytes may also include those composed of raw material components of $Li_2S$ and a sulfide(s) of an element(s) of Groups 13 to 15 of the periodic table. Specific examples of the combination of the raw materials include $Li_2S$—$P_2S_5$, $Li_2S$—$GeS_2$, $Li_2S$—$GeS_2$—$ZnS$, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$LiI$, $Li_2S$—$SiS_2$—$Li_4SiO_4$, $Li_2S$—$SiS_2$—$Li_3PO_4$, $Li_{10}GeP_2Si_2$. These raw materials may be mixed in any ratio appropriately selected. Examples of a method for synthesizing a sulfide-based inorganic solid electrolyte from these raw material components include an amorphization method such as a mechanical milling method, and a melt-quenching method.

The sulfide-based inorganic solid electrolyte can be synthesized with reference to, for example, Journal of Power Sources, 233, (2013), pp 231-235, and Chem. Lett., (2001), pp 872-873.

Among (2) the oxide-based inorganic solid electrolytes, preferred are those that contain an oxygen-atom (0) and a metal belonging to Group 1 or Group 2 of the periodic table and has ionic conductivity and electronic insulating property.

Examples of the oxide-based inorganic solid electrolytes include $Li_xLa_yTiO_3$ (wherein x=0.3 to 0.7, and y=0.3 to 0.7) (LLT), $Li_7La_3Zr_2O_{12}$ (LLZ, Lithium lanthanum zirconate), $Li_{3.5}Zn_{0.25}GeO_4$ with a LISICON crystal structure, $LiTi_2P_3O_{12}$ with a NASICON crystal structure, $Li_{1+m+n}(Al, Ga)_m(Ti,Ge)_{2-m}Si_nP_{3-n}O_{12}$ (wherein 0≤m≤1 and 0≤n≤1), and $Li_7La_3Zr_2O_{12}$ with a garnet crystalline structure.

Examples of the oxide-based inorganic solid electrolyte also include phosphorus compounds containing Li, P, and O. More specific examples are a lithium phosphate ($Li_3PO_4$), and LiPON in which a part of the oxygen atoms of a lithium phosphate is replaced with a nitrogen atom, LiPOD (D represents at least one selected from the group including Ti, V, Cr, Mn, Fe, Co, Ni, Cu, Zr, Nb, Mo, Ru, Ag, Ta, W, Pt, Au, and the like). Further, examples of the oxide-based inorganic solid electrolyte also include LiAON (A represents at least one selected from the group including of Si, B, Ge, Al, C, Ga, and the like).

The mean particle diameter of the inorganic solid electrolyte is not particularly limited, but usually it is preferably 0.01 to 100 μm, and more preferably 0.1 to 50 μm.

<<<Solid Electrolyte Layer Binder Resin>>>

The binder resin used in the solid electrolyte layer in the present embodiment may be of any type. Any binder resin generally used in all-solid-state secondary batteries may be used. The binder resin may be composed of a single kind of binder resin or two or more kinds thereof in combination.

Examples of the binder resin of the solid electrolyte layer include fluorine-based resins such as polytetrafluoroethylene (PTFE), polyvinylene difluoride (PVdF), and a copolymer (PVdF-HFP) of polyvinylene difluoride and hexafluoropropylene; hydrocarbon-based resins such as polyethylene, polypropylene, styrene butadiene rubber (SBR), hydrogenated styrene butadiene rubber (HSBR), butylene rubber, acrylonitrile butadiene rubber, polybutadiene, and polyisoprene; acrylic-based resins such as a copolymer of (meth)acrylic acid and (meth)acrylic acid alkyl ester such as (meth)methyl acrylate, a copolymer of (meth)methyl acrylate and styrene, a copolymer of (meth)methyl acrylate and acrylonitrile, and a copolymer of (meth)butyl acrylate, acrylonitrile, and styrene; polyurethane-based resin; polyurea-based resins; polyamide-based resins; polyimide-based resins; polyester-based resins; polyether-based resins; polycarbonate-based resins; and cellulose derivative resins.

<<Electrode Other than the Electrode for an all-Solid-State Secondary Battery of the Present Embodiment>>

In the all-solid-state secondary battery of the present embodiment, if the positive electrode is the electrode for an all-solid-state secondary battery of the present embodiment of which electrode active material layer does not contain a solid electrolyte, the negative electrode may have an electrode active material layer containing a solid electrolyte on a current collector, or the negative electrode may be a sheet of carbonaceous material, metal (or metal alloy), or metal oxide. On the contrary, if the negative electrode is the electrode for an all-solid-state secondary battery of the present embodiment of which electrode active material layer does not contain a solid electrolyte, the positive electrode may have an electrode active material layer containing a solid electrolyte on a current collector or the positive electrode may be a sheet of a metal (or metal alloy) or metal oxide.

The electrode that has an electrode active material layer containing a solid electrolyte on a current collector is an electrode that has, on a current collector, an electrode active material, a binder resin, and an electrode active material layer that contains a solid electrolyte (preferably an inorganic solid electrolyte). In other words, the electrode that has an electrode active material layer containing a solid electrolyte on a current collector is the same as the above-described electrode for an all-solid-state secondary battery of the present embodiment, except that the electrode active material layer contains a solid electrolyte and the binder resin may not be a polyimide-based resin.

The amount of the inorganic solid electrolyte contained in the electrode active material layer (the positive electrode active material layer and the negative electrode active material layer) is not particularly limited, but usually it is preferably 10 to 40% by mass, and more preferably 20 to 30% by mass. The solid electrolyte in the electrode active material layer may be of any type, such as those mentioned above as examples of the inorganic solid electrolyte used in the solid electrolyte layer. The solid electrolyte may be composed of a single kind of solid electrolyte or two or more kinds thereof in combination.

The binder resin used in the electrode active material layer containing a solid electrolyte may be of any type Any one of conventionally known positive electrode binder resins and negative electrode binder resins may be used. Examples of the binder resin include fluorine-based resins such as polytetrafluoroethylene (PTFE), polyvinylidene fluoride (PVdF), a polyvinylidene fluoride-hexafluoropropylene copolymer (PVdF-HFP); hydrocarbon-based resins such as polyethylene, polypropylene, styrene butadiene rubber (SBR), hydrogenated styrene butadiene rubber (HSBR), butylene rubber, acrylonitrile butadiene rubber, polybutadiene, and polyisoprene; acrylic-based resins; styrene-based resin; amide-based resins; acrylamide-based resins; imide-based resins; urethane-based resins; urea-based resins; polyester-based resins; polyether-based resins; phenol-based resins; epoxy-based resins; polycarbonate-based resins; and silicone-based resins. The examples also include anionic polymers such as polyacrylic acid, polymethacrylic acid, polysulfonic acid, and salts thereof. The examples further include celluloses such as carboxyalkyl cellulose, hydroxyalkyl cellulose, polyvinyl alcohol, polyalkylene glycol, polyvinylpyrrolidone, alginic acid, and salts thereof. As the binder resin used in the electrode active material layer containing a solid electrolyte, any one of the polyimide-based resins as described above may be used. Also in the electrode active material layer containing a solid electrolyte, the binder resin may be composed of a single kind of binder resin or two or more kinds thereof in combination.

The electrode is not limited to an electrode containing an electrode active material layer on a current collector, and may be a sheet made of an electrode active material or a current collector itself on which an electrode active material layer is not formed. More specifically, the negative electrode may be a sheet of a carbonaceous material, metal (metal alloy), metal oxide, or the like. Among them, a sheet of a carbonaceous material can be suitably used. The positive electrode may be a sheet of a metal (metal alloy), metal oxide, or the like. Among them, a lithium foil, a sheet of a lithium-containing compound such as a lithium-containing transition metal oxide can be suitably used. Particularly preferably, the positive electrode is a lithium foil.

<<Producing Method of all-Solid-State Secondary Battery>>

The all-solid-state secondary battery of the present embodiment can be produced by: preparing, as described above, the positive electrode sheet and the negative electrode sheet, which are the electrodes for the all-solid-state secondary battery of the present embodiment; preparing, separately from these sheets, a solid electrolyte-containing sheet that contains a solid electrolyte such as described above; and laminating and integrating the positive electrode sheet, the solid electrolyte-containing sheet, and the negative electrode sheet by, for example, a dry method. Also in the case of using an electrode other than the electrode for an all-solid-state secondary battery of the present embodiment, i.e., in the case of using an electrode that has an electrode active material layer containing a solid electrolyte on a current collector or using a sheet of a carbonaceous material, metal (metal alloy), metal oxide or the like, the electrode for an all-solid-state secondary battery of the present embodiment can be produced in a manner similar to the above by: preparing a positive electrode sheet and a negative electrode sheet (if a sheet of a carbonaceous material, metal (metal alloy), metal oxide or the like is used, preparing a sheet thereof); preparing, separately from these sheets, a solid electrolyte-containing sheet; and then laminating and integrating the positive electrode sheet, the solid electrolyte-containing sheet, and the negative electrode sheet.

<<<Preparation of Solid Electrolyte Containing Sheet>>>

The solid electrolyte containing sheet can be produced by: mixing and slurrying the solid electrolyte, binder resin for solid electrolyte layers and solvent as described above to prepare a solid electrolyte-containing paste; applying this paste on a substrate and then drying it to form a solid electrolyte layer on the substrate; and peeling the formed solid electrolyte layer from the substrate.

There is no particular limitation on the mixing conditions for preparing the solid electrolyte-containing paste. The mixing conditions may be appropriately selected. In the case where a lithium salt or another additive is added to the solid electrolyte layer, it may be added to the solvent concurrently with the solid electrolyte and the binder resin and mixed together, or may be separately added to the solvent and mixed therein.

The solvent of the solid electrolyte-containing paste may be of any type, and may be any one of solvents generally used. Examples of the solvent include alcoholic solvents such as methyl alcohol, ethyl alcohol, 1-propyl alcohol, 2-propyl alcohol, 2-butanol, ethylene glycol, propylene glycol, glycerine, 1,6-hexanediol, cyclohexanediol, sorbitol, xylitol, 2methyl-2,4-pentanediol, 1,3-butanediol, and 1,4-butanediol: ether-based solvents such as alkylene glycol alkyl ether (ethylene glycol monomethyl ether, ethylene glycol monobutyl ether, diethylene glycol, dipropylene glycol, propylene glycol monomethyl ether, diethylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, diethylene glycol monobutyl ether, etc.), dimethyl ether, diethyl ether, tetrahydrofuran, cyclopentyl methyl ether, dimethoxyethane, and 1,4-dioxane; amide-based solvents such as N,N-dimethylformamide, N-methyl-2-pyrrolidone, N-ethyl-2-pyrrolidone, 2-pyrrolidinone, 1,3-dimethyl-2-imidazolidinone, F-caprolactam, formamide, N-methylformamide, acetamide, N-methylacetamide, N,N-dimethylacetamide, N-methylpropionamide, and hexamethylphosphoric triamide; ketone-based solvents such as acetone, methyl ethyl ketone, methylisobutyl ketone, diethyl ketone, dipropyl ketone, diisopropyl ketone, diisobutyl ketone, and cyclohexanone; aromatic hydrocarbon solvents such as benzene, toluene, xylene, chlorobenzene, and dichlorobenzene; aliphatic hydrocarbon solvents such as hexane, heptane, octane, decane, and dodecane; alicyclic hydrocarbon solvents such as cyclohexane, cycloheptane, cyclooctane, and cyclononane; ester-based solvents such as ethyl acetate, propyl acetate, butyl acetate, ethyl butyrate, butyl butyrate, butyl valeric acid, γ-butyrolactone, and heptane; carbonate-based solvents such as ethylene carbonate, dimethyl carbonate, diethyl carbonate, ethyl methyl carbonate, and propylene carbonate; nitrile-based solvents such as acetonitrile, propionitrile, butyronitrile, isobutyronitrile, and benzonitrile. The solvent may be composed of a single kind of solvent or two or more kinds thereof in combination.

The amount of the solvent in the solid electrolyte-containing paste is not particularly limited, but usually it is preferably 20 to 99% by mass, more preferably 25 to 90% by mass, and even more preferably 30 to 80% by mass.

Incidentally, the binder resin may be dissolved in the solid electrolyte-containing paste or insoluble therein.

The substrate to which the solid electrolyte-containing paste is applied is not particularly limited as long as the solid electrolyte layer can be formed on the substrate. For example, the substrate may be a sheet of an organic material or an inorganic material. Examples of the organic material of the substrate include various polymers such as polyethylene terephthalate, polypropylene, polyethylene, and cellulose. Examples of the inorganic material of the substrate include glass and ceramic.

There is no particular limitation on a method for applying the solid electrolyte-containing paste on the substrate. The application method may be appropriately selected. Examples of the application method include spray coating, spin coating, dip coating, slit coating, stripe coating, and bar coating.

There is no particular limitation on the drying conditions for the solid electrolyte-containing paste applied on the substrate. The drying conditions may be appropriately selected. The drying temperature is not particularly limited, but usually it is preferably 30 to 300° C., more preferably 60 to 250° C., and even more preferably 80 to 200° C. The drying may be performed in vacuum, in air, in dry air, or in an inert gas (e.g., argon gas, helium gas, or nitrogen gas).

The solid electrolyte-containing sheet can be obtained by peeling the thus formed solid electrolyte layer from the substrate.

<<<Preparation of an Electrode Sheet Other than the Electrode for an all-Solid-State Secondary Battery of the Present Embodiment>>>

An electrode that has an electrode active material layer containing a solid electrolyte on a current collector can be produced by: mixing and slurrying an electrode active material, solid electrolyte (preferably, inorganic solid electrolyte), binder resin for a solid electrolyte layer and solvent as described above to prepare a paste that contains an electrode active material and a solid electrolyte (an electrode mixture paste), applying this paste on a current collector and then drying it to form an electrode active material layer on the current collector. The electrode active material layer can be formed in a similar manner as in the aforementioned formation of the solid electrolyte layer of the solid electrolyte-containing sheet, except that the electrode active material is added.

As the binder resin for an electrode active material layer containing a solid electrolyte, a polyimide-based resin may be used. In this case, the electrode can be produced in a similar manner to the electrode for an all-solid-state secondary battery of the present embodiment as described above, except that a solid electrode is added to the electrode mixture paste, and a lithium salt is not added to the electrode mixture paste.

<<<Lamination of the Positive Electrode Sheet, Solid Electrolyte-Containing Sheet, and Negative Electrode Sheet>>>

The all-solid-state secondary battery can be produced by: laminating the positive electrode sheet and negative electrode sheet (the electrode sheets of the present embodiment) and the solid electrolyte-containing sheet prepared as described above in the order of the positive electrode sheet, the solid electrolyte-containing sheet, and the negative electrode sheet; and integrating them together. In the lamination process, the positive electrode sheet and the solid electrolyte-containing sheet may be firstly laminated, and then the obtained laminate and the negative electrode sheet may be laminated together. Alternatively, the lamination process may be carried out in the reversed order. Specifically, the negative electrode sheet and the solid electrolyte-containing sheet may be firstly laminated, and then the obtained laminate and the positive electrode sheet may be laminated together.

The laminate of the positive electrode sheet, the solid electrolyte-containing sheet, and the negative electrode sheet may be integrated by pressurization. A method for pressurization may be appropriately selected, and one example thereof is a method using a hydraulic cylinder press machine or the like. The pressure to be applied to the laminate is not particularly limited, but usually it is preferably within a range from 50 to 1500 MPa. The atmosphere during the pressurization is not particularly limited. The pressurization may be performed in air, in dry air, or in an inert gas (e.g., argon gas, helium gas, or nitrogen gas), for example. The pressing time is not particularly limited, and may be appropriately selected. For example, high pressure may be applied for a short period of time (e.g., several hours or less), or medium pressure may be applied for a long period of time (one or more days).

Further, the laminate of the positive electrode sheet, the solid electrolyte-containing sheet, and the negative electrode sheet may be heated at the same time as the pressing. The heating temperature is not particularly limited, but usually it is within a range of 30 to 300° C.

Incidentally, the pressure may be applied to the sheet surface uniformly or unevenly. Further, the magnitude of the pressure being applied may be changed during the pressurization.

The thus obtained all-solid-state secondary battery may be enclosed in a housing as required for use.

Since the all-solid-state secondary battery of the present embodiment is very safe and has a high capacity, it can be suitably used for various applications. For example, the all-solid-state secondary battery of the present embodiment can be suitably used for automobiles (electric vehicles and the like). In addition, the all-solid-state secondary battery of the present embodiment can be suitably used for mobile phones, smartphones, tablets, small unmanned aerial vehicles (drones, etc.), and the like.

EXAMPLES

Hereinafter, the present disclosure will be described in more detail with reference to examples, but the present disclosure is not limited to the examples.

Example 1

A negative electrode mixture paste was prepared by: blending silicon monoxide as a negative electrode active material, UPIA (registered trademark)-LB-1001 [manufactured by UBE Corporation, polyimide-precursor varnish] as a binder resin for electrodes, acetylene black as a conductive auxiliary agent, and LiTFSI (bis(trifluoromethanesulfonyl)imide lithium; $LiN(CF_3SO_2)_2$) in a ratio of 77.5:4.8:14.5:3.2 (by mass; UPIA-LB-1001: the quantity of solids [polyimide precursors]); and adding NMP (N-methyl-2-pyrrolidone) such that the slurry concentration became about 50% by mass. The prepared negative electrode mixture was applied on a current collector, i.e., a nickel-plated steel foil (thickness: 10 μm), placed in a vacuum dryer, and heat-treated at 350° C. for 1 hour to prepare an electrode (the negative electrode) on which an electrode active material layer having a thickness of 3 μm and no solid electrolyte was formed.

The prepared negative electrode was cut into a size of 3 cm×5 cm. The negative electrode, a polyethylene oxide-based polymer electrolyte membrane (thickness: 80 μm) as a solid electrolyte layer, and a lithium foil (thickness: 500 μm) as a counter electrode (the positive electrode) were laminated in this order. Then, the negative electrode current collector and the positive electrode were coupled to each other. An all-solid-state battery was thus obtained.

The all-solid-state battery was subjected to 30 charge/discharge cycles at a constant current of 0.56 mA at a battery voltage ranging from 1 mV to 1 V in the environment of 60° C. The discharge capacity of the first cycle was taken as the initial discharge capacity. The discharge capacity of the 30th cycle was divided by the initial discharge capacity to obtain a value, and this value was taken as the capacity retention rate (%) after 30 cycles.

The initial discharge capacity of the prepared all-solid-state battery was 1408 mAh/g. The capacity density for the negative electrode material was 1.0 mAh/cm². The capacity retention rate after 30 cycles was 100%.

Reference Example 1

An all-solid-state battery was prepared in the same manner as in Example 1, except that LiTFSI was not added to the negative electrode mixture paste.

As in Example 1, the prepared all-solid-state battery was subjected to 30 charge/discharge cycles at a constant current of 0.56 mA at a battery voltage ranging from 1 mV to 1 V in the environment of 60° C. The discharge capacity of the first cycle was taken as the initial discharge capacity. The discharge capacity of the 30th cycle was divided by the initial discharge capacity to obtain a value, and this value was taken as the capacity retention rate (%) after 30 cycles.

The initial discharge capacity of the prepared all-solid-state battery was 1245 mAh/g. The capacity density for the negative electrode material was 1.0 mAh/cm². The capacity retention rate after 30 cycles was 97%.

Example 2

A negative electrode mixture paste was prepared by: blending silicon as a negative electrode active material, UPIA-LB-1001 [manufactured by UBE Corporation, polyimide-precursor varnish] as a binder resin for electrodes, acetylene black as a conductive auxiliary agent, and LiTFSI (bis(trifluoromethanesulfonyl)imide lithium; $LiN(CF_3SO_2)_2$) in a ratio of 77.5:1.9:17.4:3.2 (by mass; UPIA-LB-1001: the quantity of solids [polyimide precursors]); and adding NMP (N-methyl-2-pyrrolidone) such that the slurry concentration became about 60% by mass. The prepared negative electrode mixture was applied on a current collector, i.e., a nickel-plated steel foil (thickness: 10 μm), placed in a vacuum dryer, and heat-treated at 350° C. for 1 hour to prepare an electrode (the negative electrode) on which an electrode active material layer having a thickness of 3 μm and no solid electrolyte was formed.

The prepared negative electrode was cut into a size of 3 cm×5 cm. The negative electrode, a polyethylene oxide-based polymer electrolyte membrane (thickness: 80 μm) as a solid electrolyte layer, and a lithium foil (thickness: 500 μm) as a counter electrode (the positive electrode) were laminated in this order. Then, the negative electrode current collector and the positive electrode were coupled to each other. An all-solid-state battery was thus obtained.

The all-solid-state battery was subjected to 30 charge/discharge cycles at a constant current of 0.59 mA at a battery voltage ranging from 1 mV to 1 V in the environment of 60° C. The discharge capacity of the first cycle was taken as the initial discharge capacity. The discharge capacity of the 30th cycle was divided by the initial discharge capacity to obtain a value, and this value was taken as the capacity retention rate (%) after 30 cycles.

The initial discharge capacity of the prepared all-solid-state battery was 2615 mAh/g. The capacity density for the negative electrode material was 1.0 mAh/cm². The capacity retention rate after 30 cycles was 100%.

Reference Example 2

An all-solid-state battery was prepared in the same manner as in Example 2, except that LiTFSI was not added to the negative electrode mixture paste.

As in Example 2, the prepared all-solid-state battery was subjected to 30 charge/discharge cycles at a constant current of 0.56 mA at a battery voltage ranging from 1 mV to 1 V in the environment of 60° C. The discharge capacity of the first cycle was taken as the initial discharge capacity. The discharge capacity of the 30th cycle was divided by the initial discharge capacity to obtain a value, and this value was taken as the capacity retention rate (%) after 30 cycles.

The initial discharge capacity of the prepared all-solid-state battery was 2142 mAh/g. The capacity density for the negative electrode material was 1.0 mAh/cm². The capacity retention rate after 30 cycles was 94%.

Example 3

An all-solid-state battery was prepared in the same manner as in Example 1, except that silicon monoxide as a negative electrode active material, UPIA-LB-1001 [manufactured by UBE Corporation, polyimide-precursor varnish] as a binder resin for electrodes, acetylene black as a conductive auxiliary agent, and LiFSI (bis(fluoromethanesulfonyl)imide lithium; $LiN(FSO_2)_2$) were blended in a ratio of 77.5:4.8:14.5:3.2 (by mass; UPIA-LB-1001: the quantity of solids [polyimide precursors]).

The prepared all-solid-state battery was subjected to 22 charge/discharge cycles at a constant current of 0.56 mA at a battery voltage ranging from 1 mV to 1 V in the environment of 60° C. The discharge capacity of the first cycle was taken as the initial discharge capacity. The discharge capacity of the 22nd cycle was divided by the initial discharge capacity to obtain a value, and this value was taken as the capacity retention rate (%) after 22 cycles.

The initial discharge capacity of the prepared all-solid-state battery was 1384 mAh/g. The capacity density for the negative electrode material was 1.0 mAh/cm². The capacity retention rate after 22 cycles was 100%.

Example 4

An all-solid-state battery was prepared in the same manner as in Example 2, except that silicon as a negative electrode active material, UPIA-LB-1001 [manufactured by UBE Corporation, polyimide-precursor varnish] as a binder resin for electrodes, acetylene black as a conductive auxiliary agent, and LiFSI (bis(fluoromethanesulfonyl)imide lithium; $LiN(FSO_2)_2$) were blended in a ratio of 77.5:4.8: 14.5:3.2 (by mass; UPIA-LB-1001: the quantity of solids [polyimide precursors]).

The prepared all-solid-state battery was subjected to 22 charge/discharge cycles at a constant current of 0.56 mA at a battery voltage ranging from 1 mV to 1 V in the environment of 60° C. The discharge capacity of the first cycle was taken as the initial discharge capacity. The discharge capacity of the 22nd cycle was divided by the initial discharge capacity to obtain a value, and this value was taken as the capacity retention rate (%) after 22 cycles.

The initial discharge capacity of the prepared all-solid-state battery was 2731 mAh/g. The capacity density for the negative electrode material was 1.0 mAh/cm². The capacity retention rate after 22 cycles was 100%.

Note that LiTFSI (bis(trifluoromethanesulfonyl)imide lithium; $LiN(CF_3SO_2)_2$) has a solubility in water, NMP at 25° C. of 50 g/100 g of solvent or more, a solubility in ethanol at 25° C. of 50 g/100 g of solvent or more, a solubility in methyl benzoate at 25° C. of 50 g/100 g of solvent or more, and a solubility in ethyl benzoate at 25° C. of 50 g/100 g of solvent or more, and that LiTFSI has an ionic conductivity at 25° C. of $5.1 \times 10^{-3}$ S/cm. The solubility was measured by the method described below. The ionic conductivity was measured in accordance with the above-described method.

(Measurement of Solubility)

Five grams of LiTFSI (bis(trifluoromethanesulfonyl)imide lithium; $LiN(CF_3SO_2)_2$) was added to ten grams of any one of water and various organic solvents (e.g., NMP, ethanol, methyl benzoate, and ethyl benzoate described above), and stirred at 25° C. for 24 hours. The resulting solution was filtered, and no residue was found on the filter paper. As a result, the solubility of LiTFSI in water or any one of the various organic solvents at 25° C. was determined to be 50 g/100 g of solvent or more.

This patent application is based on Japanese Patent Application (Japanese Patent Application No. 2020-110037) filed with the Japan Patent Office on Jun. 25, 2020, the contents of which are incorporated herein by reference.

INDUSTRIAL APPLICABILITY

According to the present disclosure, it is possible to obtain a practical all-solid-state secondary battery that can work without containing a solid electrolyte, which was an essential component for conventional electrodes for all-solid-state secondary batteries, contained in an electrode active material layer.

The invention claimed is:

1. An all-solid-state secondary battery, comprising a positive electrode, a solid electrolyte layer, and a negative electrode, wherein:
   the positive electrode and/or the negative electrode has an electrode active material layer that includes an electrode active material and a binder resin, on a current collector, wherein
   the binder resin contains a polyimide-based resin, and
   the electrode active material layer contains a lithium salt having a solubility in water or at least one organic solvent at 25° C. of 0.1 g/100 g of solvent or more and does not contain a solid electrolyte,
   wherein the lithium salt is at least one selected from the group consisting of inorganic lithium salts, perfluoro-alkane sulfonates, $LiN(FSO_2)_2$, perfluoroalkane sulfo-nylimide salts, perfluoroalkane sulfonylmethides, fluo-roalkyl fluoride phosphates, and oxalatoborate salts,
   wherein the solid electrolyte layer comprises a polymer solid electrolyte, wherein the polymer solid electrolyte is at least one selected from the group consisting of a polyethylene oxide-based polymer, polypropylene oxide-based polymer, perfluorocarbon sulfonic acid-based polymer, sulfonated polyetheretherketone, sulfonated polyethersulfone, and other aromatic hydro-carbon polymer electrolyte having an ionic group.

2. The all-solid-state secondary battery according to claim 1, wherein the electrode active material layer further comprises a conductive auxiliary agent.

3. The all-solid-state secondary battery according to claim 1, wherein the lithium salt has an ionic conductivity at 25° C. of $1 \times 10^{-4}$ S/cm or more.

4. The all-solid-state secondary battery according to claim 1, wherein the lithium salt is $LiN(FSO_2)_2$ or a perfluoroal-kane sulfonylimide salt or both.

5. The all-solid-state secondary battery according to claim 1, wherein the lithium salt is at least one selected from the group consisting of $LiN(FSO_2)_2$, $LiN(CF_3SO_2)_2$, LiN $(CF_3CF_2SO_2)_2$, and $LiN(CF_3SO_2)(C_4F_9SO_2)$.

6. A method for producing an all-solid-state secondary battery, comprising:
   preparing an electrode sheet having, on a current collector, an electrode active material layer that contains an electrode active material, a polyimide-based resin as a binder resin, and a lithium salt having a solubility in water or at least one organic solvent at 25° C. of 0.1 g/100 g of solvent or more and does not contain a solid electrolyte,
   wherein the lithium salt is at least one selected from the group consisting of inorganic lithium salts, perfluoro-alkane sulfonates, $LiN(FSO_2)_2$, perfluoroalkane sulfo-nylimide salts, perfluoroalkane sulfonylmethides, fluo-roalkyl fluoride phosphates, and oxalatoborate salts;
   laminating and integrating the electrode sheet, a solid electrolyte-containing sheet that contains a solid electrolyte, and a counter electrode sheet,
   wherein the solid-electrolyte-containing sheet is a layer comprising a polymer solid electrolyte, wherein the polymer solid electrolyte is at least one selected from the group consisting of a polyethylene oxide-based polymer, polypropylene oxide-based polymer, perfluo-rocarbon sulfonic acid-based polymer, sulfonated polyetheretherketone, sulfonated polyethersulfone, and other aromatic hydrocarbon polymer electrolyte having an ionic group.

7. The method for producing an all-solid-state secondary battery according to claim 6, wherein preparing the electrode sheet includes:

applying, on the current collector, an electrode mixture paste that includes the electrode active material, the polyimide-based resin or a precursor thereof as the binder resin, the lithium salt having the solubility in water or at least one organic solvent at 25° C. of 0.1 g/100 g of solvent or more, and a solvent and does not include a solid electrolyte; and drying or heat-treating the electrode mixture paste to form the electrode active material layer.

8. The method for producing an all-solid-state secondary battery according to claim 6, wherein the electrode sheet, the solid electrolyte-containing sheet, and the counter electrode sheet are laminated and integrated by using a dry process.

9. An all-solid-state secondary battery according to claim 1, wherein the lithium salt has a solubility in water or at least one organic solvent at 25° C. of 10 g/100 g of solvent or more.

* * * * *